United States Patent [19]
Moseley

[11] Patent Number: 5,348,269
[45] Date of Patent: Sep. 20, 1994

[54] INLINE PNEUMATIC/MECHANICAL FLOW CONTROL VALVE SYSTEM

[76] Inventor: Brian Moseley, P.O. Box 2534 Gardist St., Duarte, Calif. 91010

[21] Appl. No.: 96,609

[22] Filed: Jul. 23, 1993

[51] Int. Cl.5 ............................................ F16K 31/122
[52] U.S. Cl. ........................................ 251/33; 251/25; 251/52; 137/505.25
[58] Field of Search ........................ 251/33, 51, 52, 25; 137/505.25, 219, 544

[56] References Cited

U.S. PATENT DOCUMENTS

| | | | |
|---|---|---|---|
| 2,488,647 | 11/1949 | Teague, Jr. | 137/505.25 |
| 2,600,137 | 6/1952 | Teague, Jr. | 137/505.25 |
| 2,900,997 | 8/1959 | Bostock | 251/25 X |
| 3,890,999 | 6/1975 | Moskow | 137/505.25 |
| 4,090,688 | 5/1978 | Workman, Jr. | 251/25 |

*Primary Examiner*—Martin P. Schwadron
*Assistant Examiner*—Kevin L. Lee
*Attorney, Agent, or Firm*—Joseph J. Regard

[57] ABSTRACT

A timed watering system for lawns, gardens, and the like, utilizing a flow actuated timer valve. The system is configured to provide a reliable and cost effective, easily implemented system for automatically dispensing a pre-determined amount of water on the area to be watered, with the valve shutting off the flow automatically once the desired amount of water has flowed through the valve. The present system can also be installed directly into the water system by municipal authorities or the like as a means of controlling the use of water and preventing waste of same. Upon reaching the predetermined maximum amount, flow to outdoor faucets would cease, and could not be re-initiated until the end of the month, when the meter is read and the valve re-set. This design may also be utilized in a reverse flow configuration, wherein the backflow pressure initiates closure of the valve, allowing for automated filling of tanks, or preventing damage to equipment to excessive pressure or lack of adequate flow. Another embodiment of the present invention teaches the utilization of a permeable membrane situated in a metering chamber, for allowing the passage of a predetermined amount of liquid in a solution through the valve, the valve closure actuated having sampled a predetermined amount of said liquid.

7 Claims, 6 Drawing Sheets

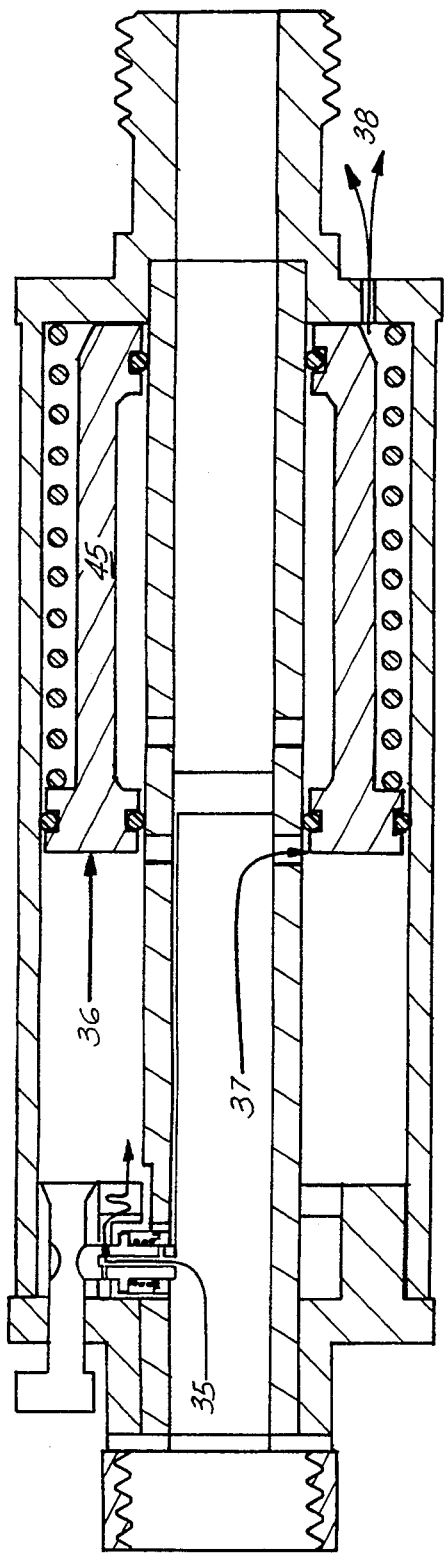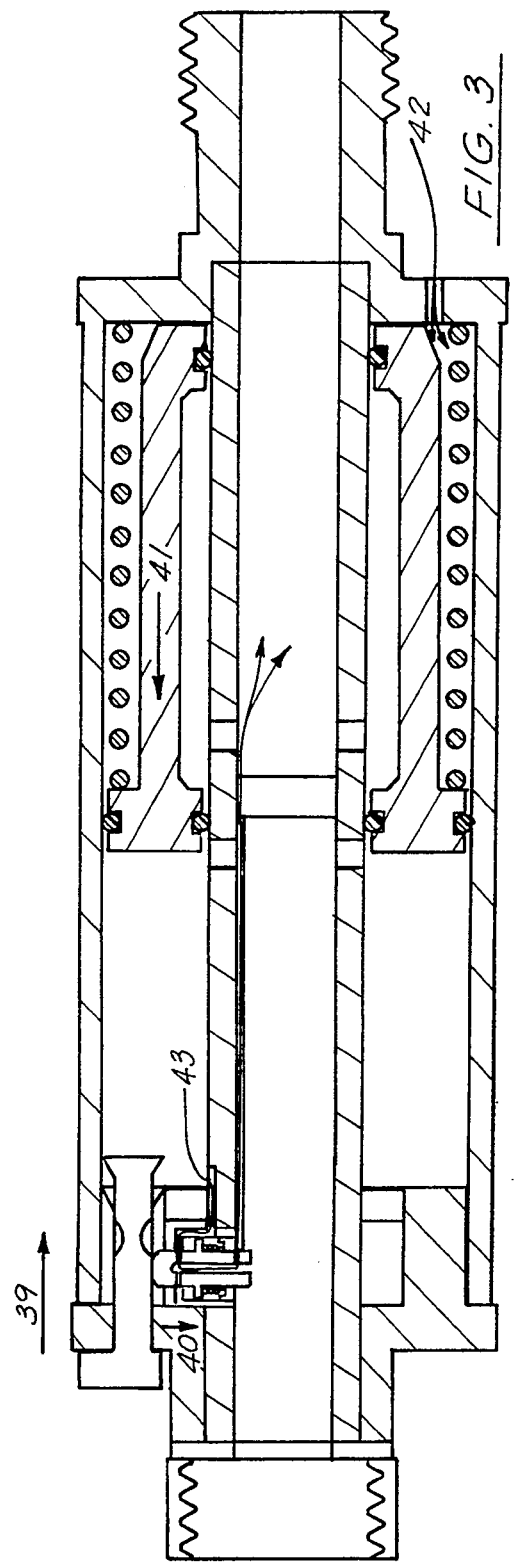

INLINE PNEUMATIC/MECHANICAL FLOW CONTROL VALVE SYSTEM

BACKGROUND OF THE INVENTION

1. Invention Field

The present invention relates to flow or timer valves, and more particularly to a timer valve configured such that the opening or closing movement of the valve is produced by the reactive force of a fluid in conjunction with the closure means for the valve.

The present invention as configured utilizes the flow of the fluid passing through the valve as the motive force for actuating the valve, the valve operation dependent upon the amount of flow passing through the valve.

An exemplary embodiment of the present invention is primarily designed for use as a timed watering system for lawns, gardens, and the like, providing a reliable and cost effective, easily implemented way for automatically dispensing a pre-determined amount of water on the area to be watered, with the valve shutting off the flow automatically once the desired amount of water has flowed through the valve.

The present system can also be installed directly into the water system by municipal authorities or the like as a means of controlling the use of water and preventing waste of same. This utilization is particularly desirable in areas with scarce or uncertain fresh water resources, such as the western states California, Arizona, and the like. This use would provide a tamper-proof system for regulating the amount of water utilized for non-essential activities such as caring for the lawn, washing the car, and the like. In such a use, the valve would be installed between the outdoor faucets and the main line, and would be set to provide for the maximum allowed water usage for discretionary activities for the month. Upon reaching that maximum amount, flow to outdoor faucets would cease, and could not be re-initiated until the end of the month, when the meter is read and the valve re-set.

This design may also be utilized in a reverse flow configuration, wherein the backflow pressure initiates closure of the valve, allowing for automated filling of tanks, or preventing damage to equipment to excessive pressure or lack of adequate flow.

Another embodiment of the present invention teaches the utilization of a permeable membrane situated in a metering chamber, for allowing the passage of a predetermined amount of liquid in a solution through the valve, the valve closure actuated upon having sampled a predetermined amount of said liquid

2. General Background Discussion

While the prior art has contemplated a variety of configurations of flow controlled valves, the inventor does not know of any timer valve systems utilizing as its actuation means the flow of fluid therethrough as contemplated in the present invention, while providing the reliability, low maintenance and relative cost effectiveness of the present invention.

A list of prior patents which may be of interest is presented below:

| Patent Number | Inventor | Date of Issue |
| --- | --- | --- |
| 4,182,371 | Moore | Jan 08, 1980 |
| 3,972,344 | Chauvigné | Aug 03, 1976 |
| 3,806,084 | Seese | Apr 23, 1974 |
| 3,722,526 | Henningsson | Mar 27, 1973 |
| 3,583,440 | Anderson | Jun 08, 1971 |
| 3,089,651 | Skerritt | May 14, 1963 |
| 2,549,909 | Joynes | Apr 24, 1951 |
| 2,323,341 | McGill | Jul 06, 1943 |
| 2,057,333 | Guibert | Oct 13, 1936 |
| 1,180,000 | Bloom | Apr 18, 1916 |
| 783,671 | Bloom | Feb 28, 1905 |
| 177,095 | Clark | May 09, 1876 |

Perhaps one of the more relevant inventions teaching a timed valve system, although admittedly in a wholly distinguishable mechanism, is 4,182,371 issued 1980, and entitled "Automatic Liquid Flow Control Device", wherein there is utilized a flow sampling technique generally similar to that contemplated in the present invention, to provide a timed actuation means for closing the system after a predetermined period. In fact, the '371 reference discusses in detail its application as an irrigation valve, recognizing the same problems referenced by you in your recitation of the present, searched for invention. The timer mechanism of '371 relies upon what appears to be a bladder system configured to block the flow over time as it was filled with the backflow.

Patent 3,089,651, issued 1963, teaches a "Lawn Sprinkler with Timed Automatic Shutoff", wherein there is also provided for a flow sampling technique in timing the flow, where the backflow is accumulated in a chamber (113), filling it to force a diaphragm (116), upward from an open to a closed position.

Patent 3,972,344, issued 1976, may comprise the most relevant patent found during the course of the search, teaching a "Valve for Water Sprinklers and the Like", wherein there is taught a valve having a "dosing chamber" configured for allowing a flow of a fraction of the liquid thereto, and a member in said chamber "movable from a first position to a second position in response to delivery into the dosing chamber in response to delivery of a given quantity of liquid".

While the prior patents above have contemplated some very general aspects of the present invention, the prior art has nonetheless failed to contemplate a system for timed or automatic dispensing of fluid flow in a straightforward, rugged, cost effective system.

SUMMARY DISCUSSION OF THE INVENTION

The present invention overcomes these prior art problems by providing a valve timer system which is highly reliable, relatively economical and very cost effective.

While the above disclosed prior art teaches systems for dispensing a timed flow of fluid for a variety of purposes, none teach or contemplate a system as reliable, easily installed and set as the present invention.

Clearly, the above disclosed patents contemplating watering or irrigation valves were either more complex and expensive than the present invention, or were of questionable durability when utilized over a period of time.

The preferred embodiment of the searched for invention comprises a fluid actuated, timer valve system having a generally cylindrical body and first and second ends, said ends comprising inlet and outlet ports, respectively. The valve further includes a flow piece generally situated longitudinally through the body, with a blocking means in a generally medial area of said flow piece. Juxtaposed said first end of said flow piece is a backflow port, and on either side of said blocking means outlet and inlet ports, respectively.

Partially enveloping said flow piece in fluid impermeable, yet moveable fashion is a spring biased flow piston having first and second ends, wherein there is provided sealing means, the first end situated generally between said backflow and outlet ports, to a point where said outlet port may be sealed by said first end sealing means, said second end situated generally between said inlet port and said second end of said body. A flow chamber is provided between said first and second ends. A selective fluid permeable, flow through membrane may be provided juxtaposed said backflow port and said outlet port, positioned between said body and said flow chamber.

The present invention is configured to provide timed flow, based upon backflow pressure flowing from said flow piece via said backflow port, directing said flow piston against said spring bias and, over a period of time, towards the second end of the body, until the outlet port is enveloped and sealed by said first end sealing means, thus directing the biased piston from a flow allowing position to a closed position. The membrane embodiment of the present invention allows the timed backflow to be based selectively upon any portion of the total fluid flow directed to a specific fluid impermeable to said membrane.

The present system may be configured to provide an approximate flow period based upon the flow rate, and consequently hydrostatic pressure associated therewith.

Another alternative embodiment of the present invention teaches the utilization of the present valve in conjunction with a system for utilization of tank filling, wherein backflow pressure from the full tank initiates closure of the valve.

Still another alternative embodiment of the present invention contemplates a system for dispensing a predetermined amount of liquid carried in a solution, notwithstanding the concentration of said liquid. This is accomplished via utilization of a membrane allowing the passage of the molecules of said liquid therethrough, the accumulation of said liquid in a predetermined amount actuating the valve closure system.

Finally, the valve of the present invention may be provided with electronic, chemical, or other sensor means for indicating conditions relative the operation of the valve.

It is thus an object of the present invention to provide a system for regulating the amount of fluid dispensed utilizing a valve having a closure means actuated by the flow of the liquid passing through the valve during a predetermined flow interval.

It is another object of the present invention to provide a system for dispensing a predetermined flow of liquid utilizing a valve which may be adjusted as to the desired flow interval.

It is still another object of the present invention to provide a cost effective, reliable system for dispensing a fluid flow for a predetermined interval.

It is another object of the present invention to provide a timer valve system which is adaptable to a wide variety of water supplies and pressures, and which is easily installed.

It is another object of the present invention to provide a timer valve system which automatically shuts the flow after a predetermined flow interval.

Lastly, it is an object of the present invention to provide a system for regulating the flow of a fluid utilizing a self contained and easily re-set system.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 2 is a side view of flow control valve of FIG. 1, illustrating the migration of the piston via backflow to the opposing end of the piston chamber, placing the valve in the closed, restricted position.

FIG. 3 is a side view of flow control valve of FIG. 1, illustrating the actuation of the reset lever, and associated communication with the backflow and vent valve, allowing the backflow to drain from the piston chamber to the valve exhaust port, allowing the spring bias to reset the piston and valve back to its open, unrestricted flow position.

DETAILED DESCRIPTION OF THE INVENTION

Figure 1:
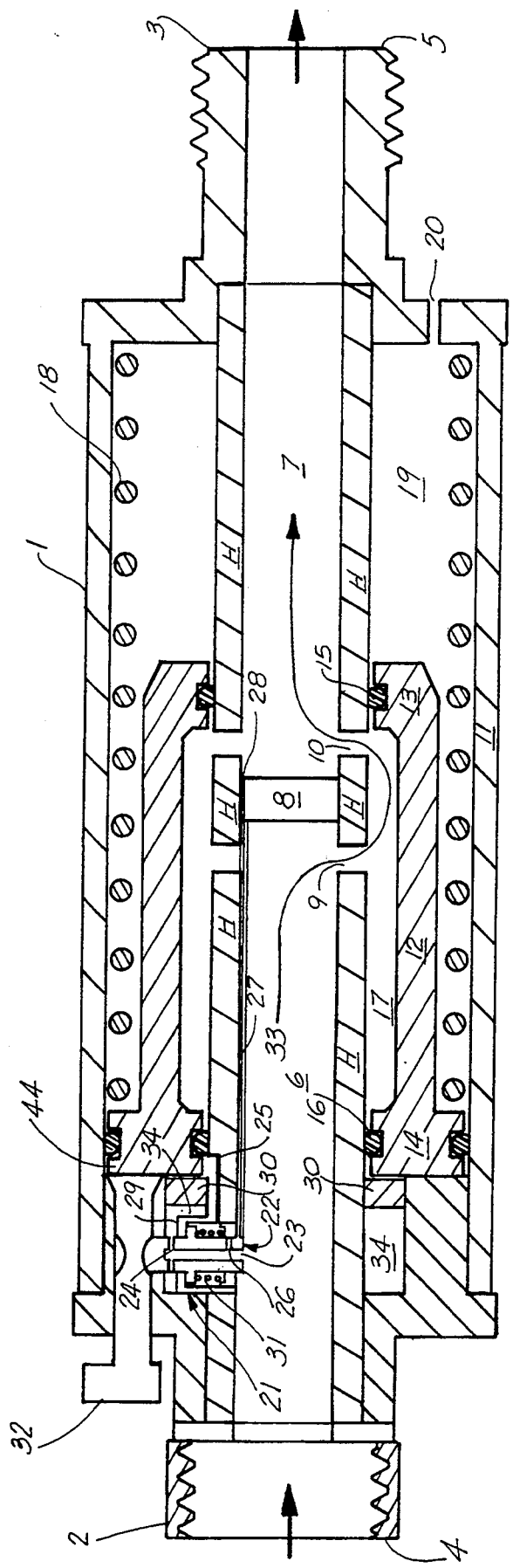
FIG. 1 is a side view of the preferred embodiment of the flow control valve of the present invention, illustrating the valve in the open, unrestricted flow position.

As can be seen in FIG. 1, the valve 1 of the preferred, exemplary embodiment of the present invention, includes a housing 11 having first 2 and second 3 ends, wherein may be found an ingress 4, and egress 5 port, respectively.

As shown, the main flow of fluid through the valve is accomplished through flow housing H running along the longitudinal axis of the valve from the ingress port 4 to the egress port 5. As further illustrated, flow housing H is divided into first 6 and second 7 portions via barrier member 8. Flow housing H has formed therein first 9 and second 10 transfer ports formed therein on either side of barrier member 8, in order to provide flow about said barrier member via secondary flow chamber 17 formed in piston 12.

Piston 12 is configured to envelope flow housing H in sealing communication via O-rings 15, 16 situated at the first 13 and second 14 portions of piston 12, respectively. Piston 12 is biased in the open, flowing position via spring 18 situated in piston chamber 19. Vent hole 20 is configured to allow for the venting of air from and to the piston chamber 19 in conjunction with the operation of piston 12. Juxtaposed piston chamber 19 and the first portion 6 of the main flow chamber is metering chamber 34, configured to provide flow from the metering chamber 34 to the piston chamber 19.

Situated in the metering chamber 34, and configured to regulate the flow of fluid from the first portion 6 of the main flow chamber and the piston chamber 19 is actuation valve 21. Actuation valve 21 includes a valve member 22 having a longitudinal passage 23 therethrough, said passage communicating with the first portion 6 of the main flow chamber, an actuation aperture 24 at the distal end of the valve member 22 from said flow chamber, and an exhaust aperture 26 located nearer said flow chamber.

As shown in FIG. 1, actuation aperture 24 is positioned via actuation valve 21 to provide fluid flow from the main flow chamber to the piston chamber via the metering chamber 34 when the valve member 22 is positioned in the proper position via actuation member 32, biased in place via spring 31. A membrane 30 for providing selective fluid flow to the piston chamber may or may not be utilized, depending upon the application, said membrane juxtaposed the metering chamber and the piston chamber.

Referring to FIGS. 1 and 2, fluid 35 flows from the first portion 6 of the main flow chamber, through the longitudinal passage 23 and actuation aperture 24 of valve member 22, through metering chamber 34 and membrane 30 (when utilized), into piston chamber, and against 36 the piston head of the piston, eventually forcing 36 the piston against the spring, migrating the piston along the longitudinal axis of the housing as it envelopes the flow housing, until the secondary flow chamber and O-rings are situated so that they no longer allow the flow of fluid from the first transfer port 9 to the second transfer port 10, stopping the flow 33 of fluid from the main flow chambers 6,7. Air is vented 38 as necessary due to the movement of the piston via vent hole 20. The time it takes the piston to migrate from the open position 44 to the closed position 45, ceasing flow of the main flow chambers 6,7, is dependent upon the hydrostatic pressure of the flow 33. Further, if a membrane 30 designed for selective fluid permeability is utilized, such as, for example, allowing the migration of a certain fluid compound, while rejecting other components of a solution, the piston chamber would only be filled with that certain fluid compound, and said valve would remain at full fluid flow through the flow chambers until that certain fluid filled the piston chamber sufficient to urge the piston to the closed position 45.

For example, a membrane 30 of TEFLON TM PTFE may be utilized for allowing the selective migration and separation of fine particulate matter, living or dead, from a fluid carrying solution in the main flow chamber into the piston chamber; implementation of this system would allow the present invention to be utilized to provide flow up to a predetermined concentration of the diluted solution, by the continued sampling (via flow through the actuation valve and membrane), separation, and utilization of the separated solvent for migrating the piston towards the closed position in conjunction with the amount of matter segregated from the flow. This valve could therefore be utilized in a medical context for administering a diluted solution to a patient, or for analytical separations.

In order to open the valve flow, the system must be reset to allow for the venting of the fluid in the piston chamber, allowing the spring to urge the piston from the closed position to the open position. As shown in FIG. 3, pressing 39 the actuation member (32 in FIG. 1) causes valve member (22 in FIG. 1) to be urged downward 40, aligning actuation passage (24 in FIG. 1) with the valve close passage (25 in FIG. 1), allowing the venting 43 of the fluid trapped in the piston chamber through the exhaust port (28 in FIG. 1), and into the second portion of the main flow chamber, venting the piston chamber and allowing the migration 41 of piston back to the open position via spring bias; the piston chamber portion wherein the spring is located is vented via air flow 42 through the vent hole, and the system is reset.

Figure 4:
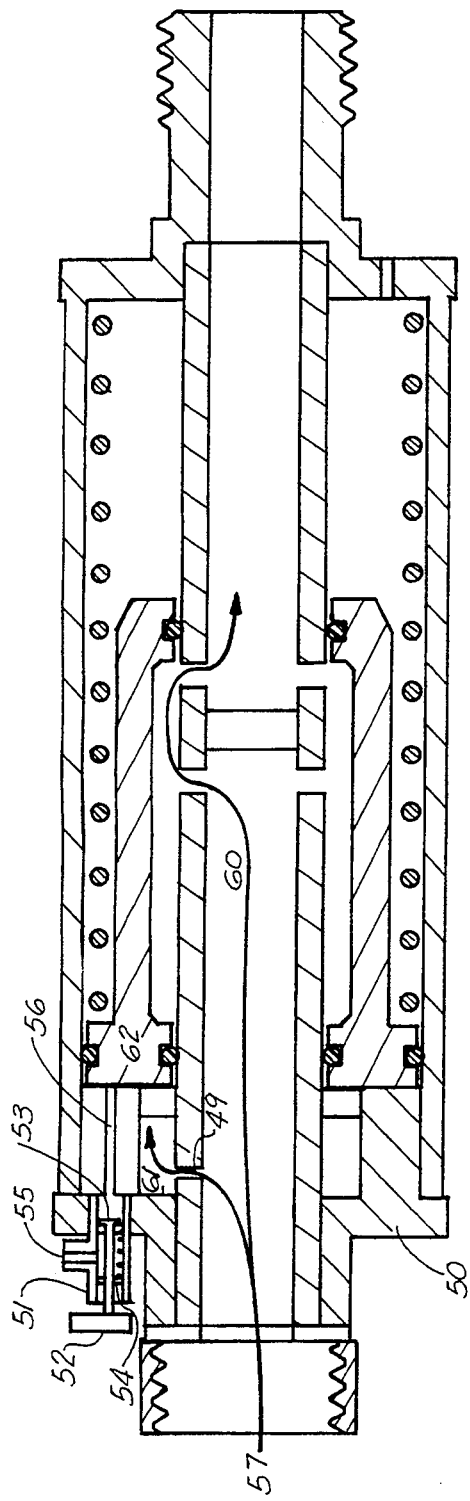
FIG. 4 is an alternate embodiment of the invention of FIG. 1, teaching a different backflow configuration and vent valve, illustrating the valve in the open, unrestricted flow position.

An alternative embodiment of the present invention, wherein the actuation member and valve is removed from the metering chamber, is illustrated in FIGS. 4–7. As shown in FIG. 4, the actuation valve 51 of this alternative embodiment of the present invention is situated in conjunction with the actuation member 52.

Figure 5:
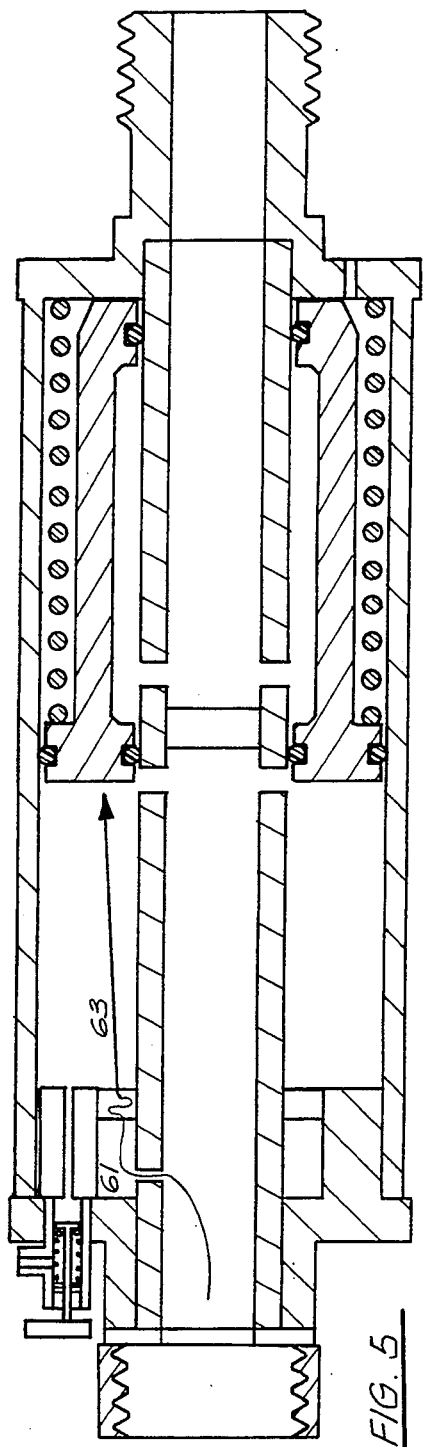
FIG. 5 is a side view of flow control valve of FIG. 4, illustrating the migration of the piston via backflow to the opposing end of the piston chamber, placing the valve in the closed, restricted position.
Figure 6:
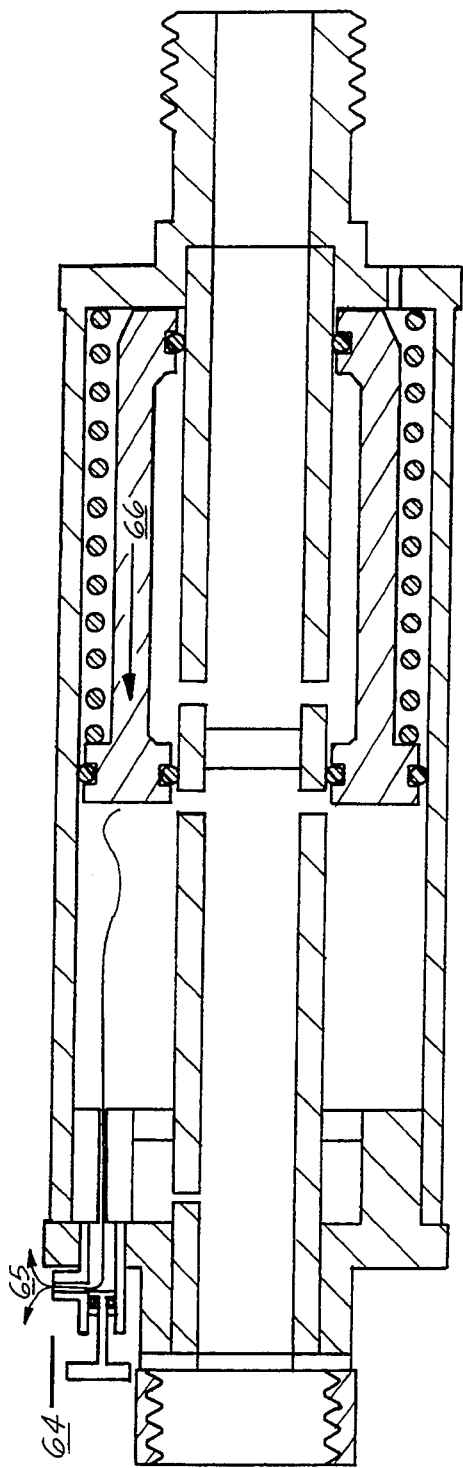
FIG. 6 is a side view of flow control valve of FIG. 4, illustrating the actuation of the reset lever, and associated communication with the backflow and vent valve, allowing the backflow to drain from the piston chamber to the valve exhaust port.

The alternative embodiment works in much the same fashion as the preferred embodiment of the invention supra, except as follows. The flow 57 of fluid through the main flow chamber has a small portion of it diverted via passage 49, directly through 61 the metering chamber (and the membrane, if utilized, in the same fashion as the preferred embodiment supra). As illustrated in FIGS. 4 and 5, the flow then comes into communication with the piston head 62, urging 63 the piston to the closed position, as shown in FIG. 5. The flow is distinguishable from that taught in the preferred embodiment, supra, wherein the diverted fluid had to pass through the actuation valve prior to reaching the metering chamber. Other than the placement and operation of the actuation valve, this alternative design functions in an identical manner to that of the preferred embodiment.

Returning to FIG. 4, the actuation valve of the alternative design is located near one of the ends of the housing, outside from the main flow chambers. Unlike the preferred embodiment of the invention, the alternative design allows for the venting of the fluid from the piston chamber outside of the valve and flow, via vent 55. This feature may be useful for sampling and analysis applications, and the like.

Figure 7:
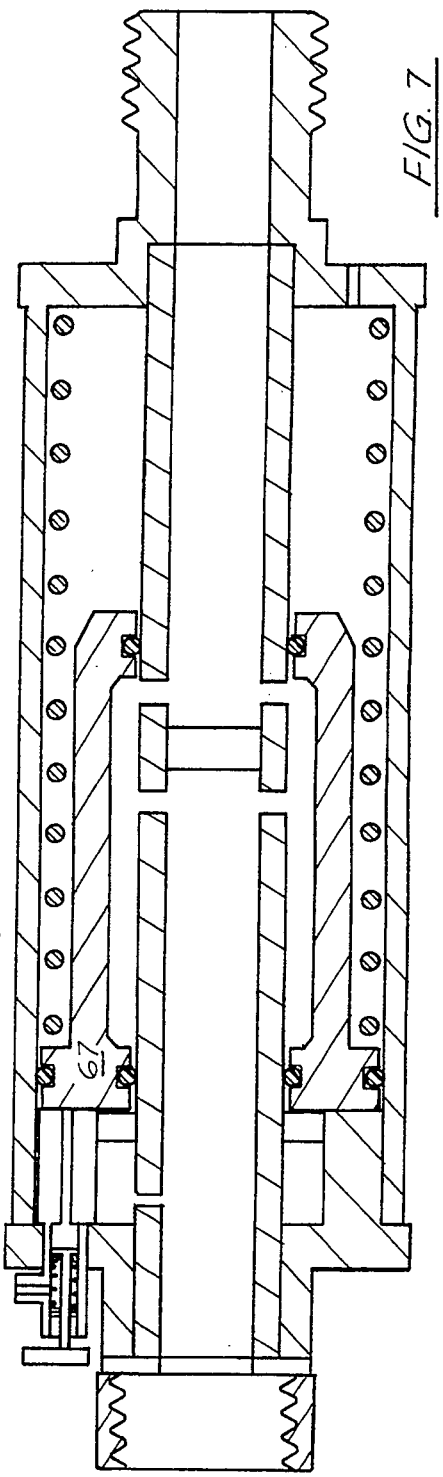
FIG. 7 is a side view of the fluid control valve of FIG. 4, illustrating migration of the piston back to the first end of the piston chamber via the piston spring, resetting the valve into its open, unrestricted flow position.

The valve includes an actuation member 52 having a plunger end 53, and biased via spring 54 in a closed position, blocking vent 55, and drain passage 56, which opens into the piston chamber. In operation, when the piston has migrated into the closed position in FIG. 5, and it is desired to re-set the valve and open the flow, referring to FIG. 6, one pulls 64 the actuation member, directing the plunger back past the vent, thereby allowing venting of the piston chamber 65 via the drain passage, and vent. Venting of the piston chamber relieves the hydrostatic pressure in same, thereby allowing the spring bias in communication with the piston to urge 66 said piston towards the closed position 67, as shown in FIG. 7.

Figure 8:
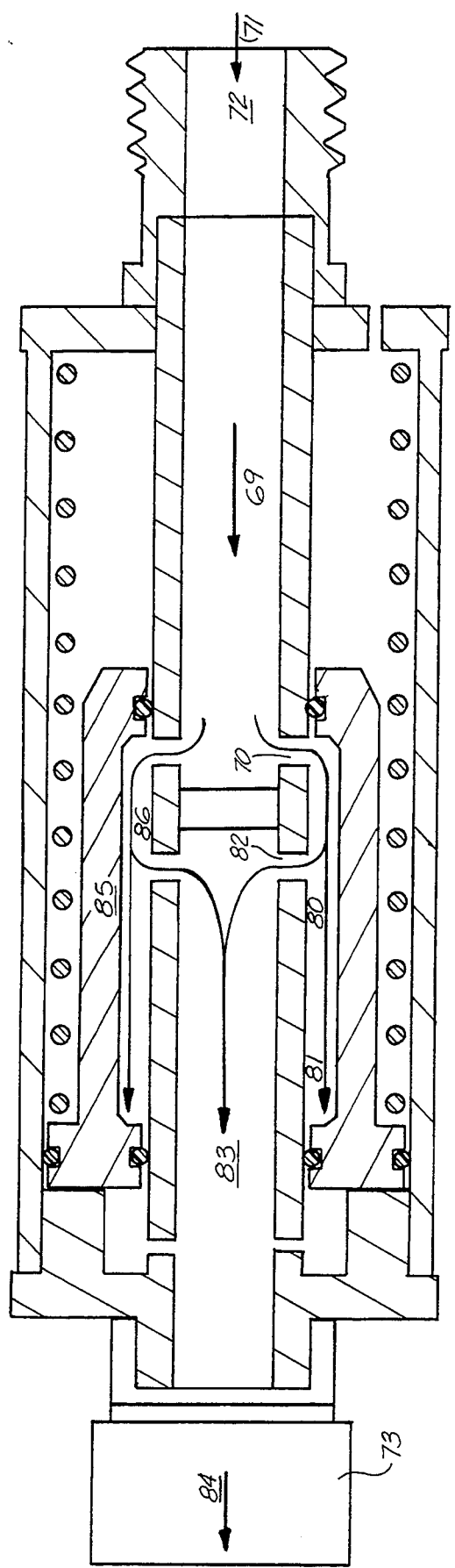
FIG. 8 is a side view of a second alternative flow control valve system of the invention of FIG. 1, wherein the valve is utilized in a reverse flow capacity for backflow actuation, the valve shown in its open, flowing position.
Figure 9:
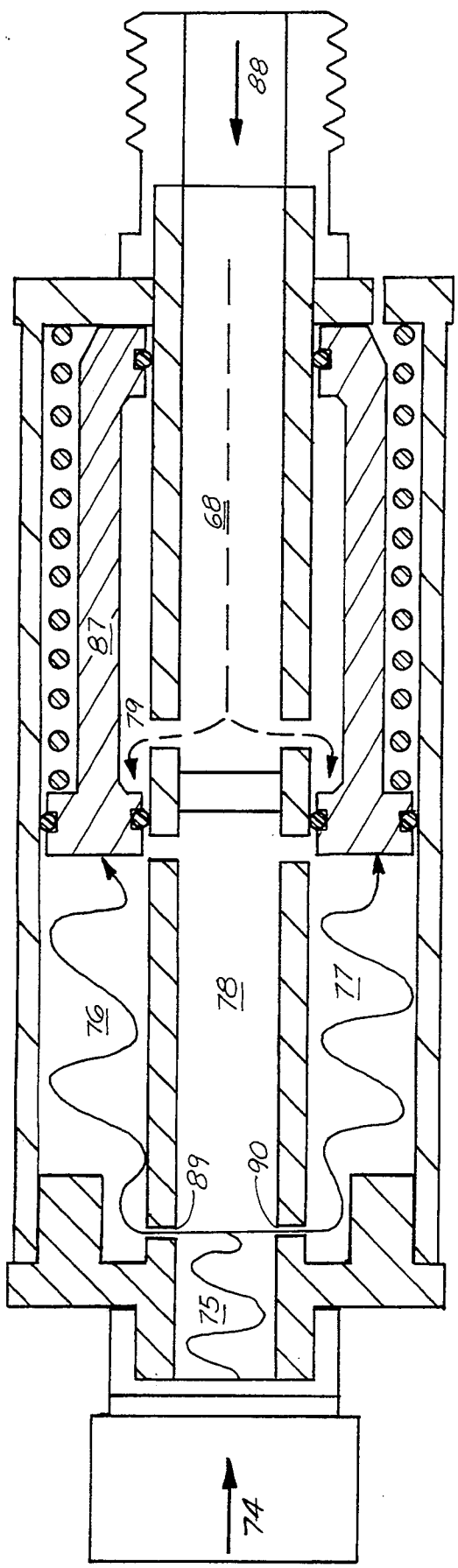
FIG. 9 is a side view of the second alternative flow control system of FIG. 8, wherein backflow has forced the piston to the opposing end of the piston chamber, placing the valve in a closed, non-flowing position.

FIGS. 8 and 9 illustrate a third embodiment of the present invention, wherein flow of the valve is dependent upon the flow condition itself. The valve of this third embodiment contains the same elements and operational characteristics as the above embodiments of the invention, with three important distinctions; first, the valve does not contain an actuation valve or means to manually vent fluid from the piston chamber; second, flow is directed in an opposite direction from that implemented in the above embodiments of the preferred embodiment and the alternative embodiment; and third, the spring uitilized in this embodiment is configured to urge the piston toward the second end of the housing, as opposed to the first end, as contemplated in the preferred embodiment of the invention. This configuration is particularly useful in providing automatic flow for certain applications, such as, for example, filling a closed tank.

As shown, in this third embodiment of the present invention, fluid inflow 71 is directed into an opposite end of the valve from the above embodiments of the invention, with flow coming into the second flow chamber 69 via ingress port 72. The flow then is directed into the first transfer port 70, where it communicates with the open 86 secondary flow chambers 80, 86, of the piston 85 in the open position 81, flowing out of said chamber via second transfer port 82, into the first main flow chamber 83, and out 84 of the valve via egress port 73, and into a tank, for example.

Upon complete filling of the tank, a backflow 74, or increase in hydrostatic pressure in the line develops. In the present embodiment of the invention, this backflow or increased hydrostatic line pressure is transmitted 75 into the first fluid chamber 78, through passages 89, 90, wherein the pressure builds in the piston chambers 76, 77, the increased pressure in the piston chambers pressing against the piston, and forcing same into the closed position 87 at the point when the backflow or hydrostatic line pressure from the backflow exceeds the hydrostatic pressure from the inflow or reduced flow 88, 68, overcoming the pressure of same in the secondary flow chambers 79.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A fluid actuated, timer valve system for providing a flow of fluid for a predetermined flow time, comprising:

a housing having first and second ends containing a longitudinal flow piece, said longitudinal flow piece having first and second ends wherein there are provided fluid ingress and egress apertures, respectively, and a passage therebetween, said longitudinal flow piece having formed generally medially therein a blocking member, forming first and second main flow chambers, said first main flow chamber having formed therein a sample flow passage and a first fluid transfer port formed therein, said second main flow chamber having formed therein a second transfer port, said longitudinal flow piece having formed thereabout a piston chamber;

a piston situated in said piston chamber, said piston having first and second ends and a secondary flow chamber formed therebetween, said piston slidingly enveloping said longitudinal flow piece such that said secondary flow chamber communicates with said first transfer port and said second transfer port when said piston is disposed near the first end of said housing, allowing the free flow of fluid from said first transfer port to said second transfer port, allowing for indirect fluid flow from said first main flow chamber to said second main flow chamber via said first transfer port and said second transfer port, said piston further slidingly enveloping said longitudinal flow piece such that said flow between said first transfer port and said second transfer port is blocked when said piston is disposed near the second end of said housing;

bias means directed generally from said second end of said housing against said piston, for urging said piston away from said second end;

said sample flow passage formed in said first main flow chamber configured to provide a metered flow of fluid from said first main flow chamber into said piston chamber, providing bias generally against the first end of said piston, such that said piston is slidingly directed towards said second end of said housing with the application of a predetermined degree of bias, interrupting fluid from said first transfer port to said second transfer port when said piston is disposed near the second end of said housing.

2. The fluid actuated, timer valve system of claim 1, wherein said bias means directed generally from said second end of said housing against said piston comprises a spring.

3. The fluid actuated, timer valve system of claim 1, wherein said housing has further formed therein a metering chamber juxtaposed said sample flow passage and said piston chamber, to provide metered flow from said sample flow passage to said piston chamber.

4. The fluid actuated, timer valve system of claim 3, wherein there is further provided a membrane juxtaposed said metering chamber and said piston chamber, said membrane configured to provide selective fluid permeability, said membrane further configured to provide selective flow of a predetermined fluid from said metering chamber to said piston chamber.

5. The fluid actuated, timer valve system of claim 1, wherein there is further provided an actuation valve juxtaposed said metering chamber, said actuation valve further comprising a valve member slidingly engaging said sample flow passage, said valve member having a longitudinal passage therethrough, said valve member having formed in communication with said longitudinal flow passage an actuation aperture, and an exhaust aperture.

6. The fluid actuated, timer valve system of claim 5, wherein there is further provided a valve close passage providing selective fluid flow from said piston chamber and said sample flow passage, and an exhaust passage configured to provided selective fluid flow from said sample flow passage to said second main flow chamber, and wherein said actuation valve further comprises an actuation member for slidingly motivating said valve member from a fluid flow position, wherein said actuation aperture is in communication with said metering chamber, allowing fluid flow from said first main flow chamber to said piston chamber, to a reset position, wherein said valve close passage is in communication with said actuation aperture, and said exhaust passage is in communication with said exhaust aperture, allowing the draining of accumulated fluid from said piston chamber to said second main flow chamber.

7. The fluid actuated, timer valve system of claim 1, wherein said housing has formed therein a drain passage in communication with said piston chamber, and wherein there is further provided an actuation valve configured to provide selective venting of fluid from said piston chamber via said drain passage, out of said housing.

* * * * *